United States Patent [19]

Connelly et al.

[11] Patent Number: 4,928,551
[45] Date of Patent: May 29, 1990

[54] VIBRATING MECHANISM

[75] Inventors: James D. Connelly; Darrel Huff, both of Princeton, W. Va.

[73] Assignee: Conn-Weld Industries, Inc., Princeton, W. Va.

[21] Appl. No.: 172,252

[22] Filed: Mar. 23, 1988

[51] Int. Cl.⁵ .............................................. F16C 33/66
[52] U.S. Cl. .................................. 74/606 R; 384/473
[58] Field of Search ..................... 74/467, 606 A, 607, 74/606 R; 384/473, 165, 177; 209/363, 403

[56] References Cited

U.S. PATENT DOCUMENTS

| | | | |
|---|---|---|---|
| 901,346 | 10/1908 | Jones | 384/473 |
| 3,039,832 | 6/1962 | Karpuk et al. | 384/165 |
| 3,905,897 | 9/1975 | Jacobson | 209/405 |
| 4,340,469 | 7/1982 | Archer | 209/363 X |
| 4,693,133 | 9/1987 | Tomita et al. | 74/606 X |

FOREIGN PATENT DOCUMENTS

| | | | |
|---|---|---|---|
| 1600331 | 1/1970 | Fed. Rep. of Germany | 384/473 |
| 2126668 | 3/1984 | United Kingdom | 384/473 |

*Primary Examiner*—Peter A. Aschenbrenner
*Attorney, Agent, or Firm*—Wilmer Mechlin

[57] ABSTRACT

Mechanism for vibrating frame-mounted screen panels having a housing containing integeared drive and driven shafts to which are keyed interfitting counterweights and which are journaled at opposite end portions in laterally spaced pairs of spherical roller bearings seated in correspondingly spaced pairs of cylindrical sockets in opposite sides of the housing, and an individual oil reservoir for each socket bounded inwardly by a crescent-shaped flange for maintaining oil therein at a level for wetting rollers of a bearing therein, the reservoirs being fed during operation of the mechanism by oil splashed by the rotating counterweights from a pool in a sump in the bottom of the housing.

6 Claims, 4 Drawing Sheets

VIBRATING MECHANISM

BACKGROUND OF THE INVENTION

Conventionally, a mechanism for vibrating screening apparatus has a housing containing counterweights keyed to intergeared shafts and adapted on rotation to generate a centrifugal The primary object of the invention is to provide an improved vibrating mechanism whereof bearings journalling shafts mounting counterweights seat in individual sockets in sides of a housing of the mechanism, and flanges inwardly bounding and radially overlapping parts of the sockets form therewith individual oil reservoirs for maintaining therein oil splashed from a pool in the bottom of the housing, at a level to continuously lubricate the bearings during operation of the mechanism.

Another object of the invention is to provide a vibrating mechanism having in opposite sides of a housing bearing-seating cylindrical sockets, each bounded inwardly and radially overlapped over a lower part by a concentric crescent-shaped flange, thereby forming at each socket an individual oil reservoir for maintaining oil fed thereto at a level to continuously lubricate a bearing seated in the socket.

An additional object of the invention is to provide a vibrating mechanism whereof a housing has in each side a pair of laterally spaced cylindrical sockets seating a pair of spherical roller bearings together journaling a pair of correspondingly spaced intergeared counterweight-mounting shafts, and a dual crescent-shaped flange inwardly bounding the pair of sockets on each side of the housing, each crescent-shaped part of each flange being concentric with and partly overlapping one of the adjoining pair of sockets and being radially spaced from the adjoining shaft, and each flange forming for each of the adjoining pair of sockets an oil gallery of sufficient capacity and relative circumferential extent to lubricate bearings in said sockets with oil splashed thereto from a pool in the housing.

A further object of the invention is to provide a vibrating mechanism of which a housing has in opposite sides cylindrical sockets seating roller bearings journaling counterweight-mounting shaft means, and a cylindrically concave oil gallery inwardly of and concentric with each of said sockets, said galleries being of such capacity and circumferential extent relative to the sockets to lubricate said bearings in operating cycles of said machine with oil supplied to said galleries from a pool in a sump in the housing.

The foregoing and other objects and advantages of the invention will appear hereafter in the detailed description, be particularly pointed out in the appended claims and be illustrated in the accompanying drawings, in which:

FIGURE DESCRIPTION

DETAILED DESCRIPTION

Figure 1:
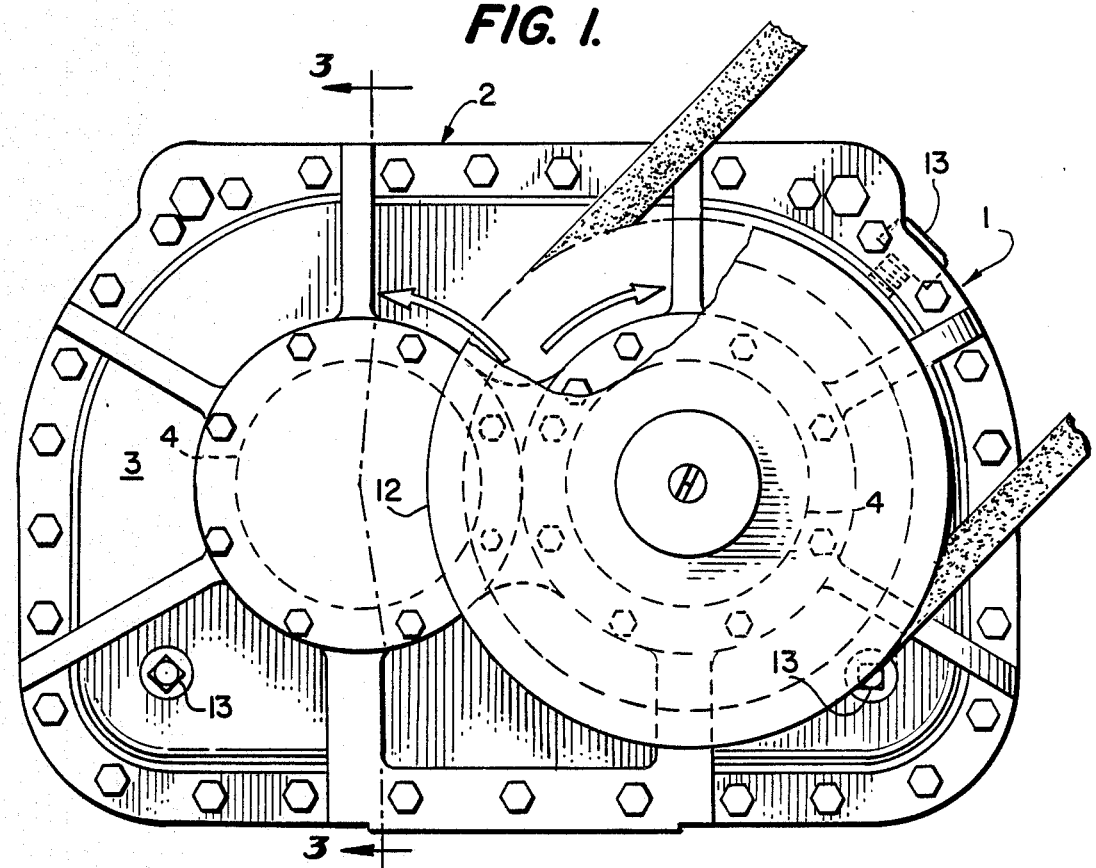
FIG. 1 is a front elevational view of a preferred embodiment of the vibrating mechanism of the present invention showing in part a sheave and V-belts of the mechanism's belt drive.
Figure 2:
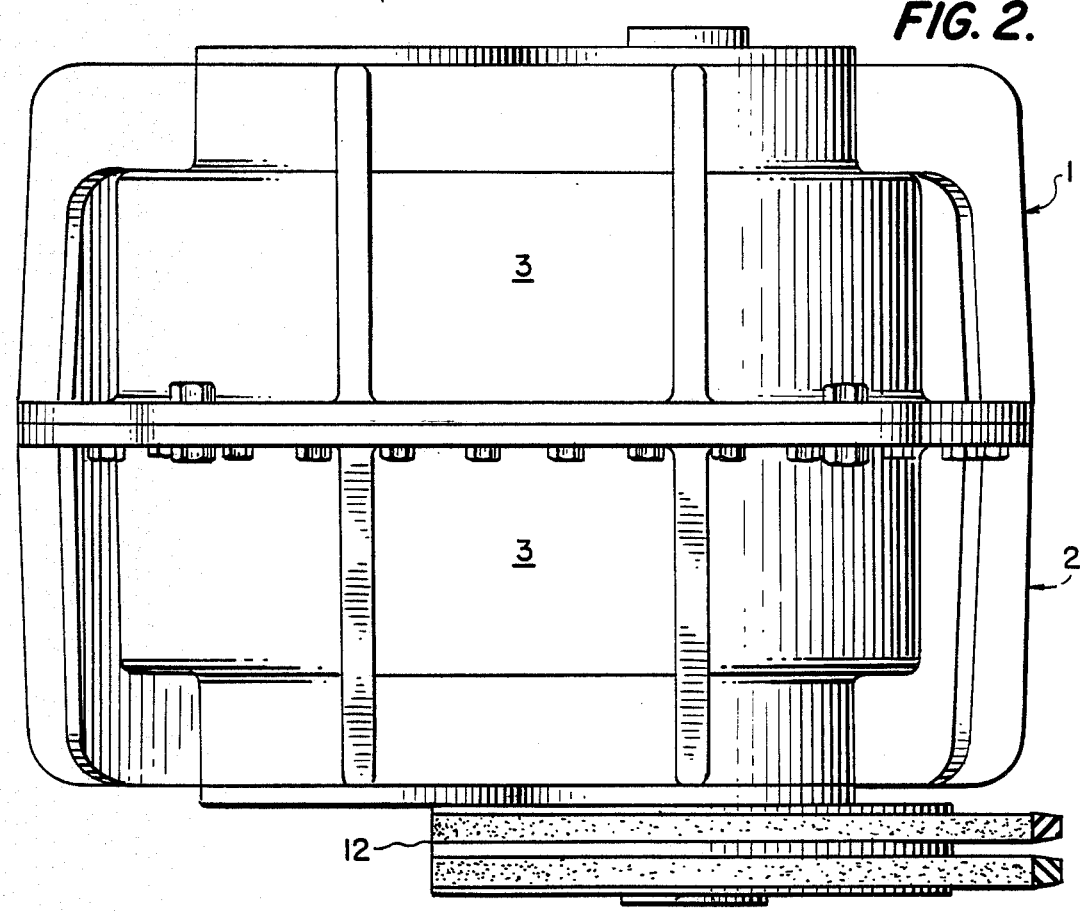
FIG. 2 is a plan view of the mechanism of FIG. 1.
Figure 3A:
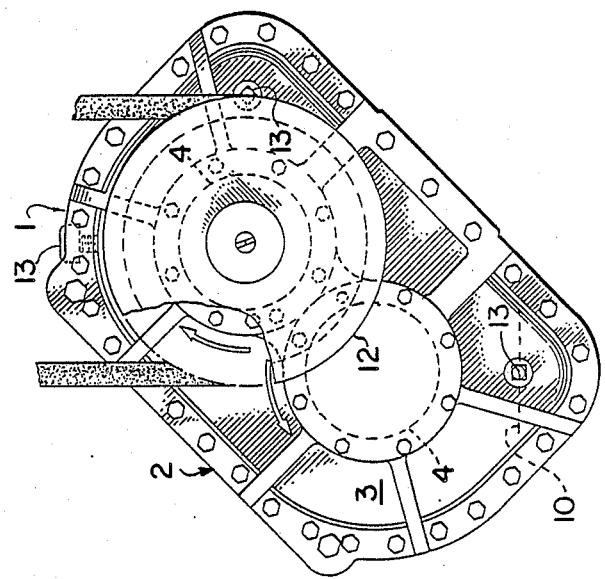
FIG. 3A is a front elevational view on a reduced scale of the mechanism of FIG. 1 forwardly tilted at a 45 degree angle.
Figure 3:
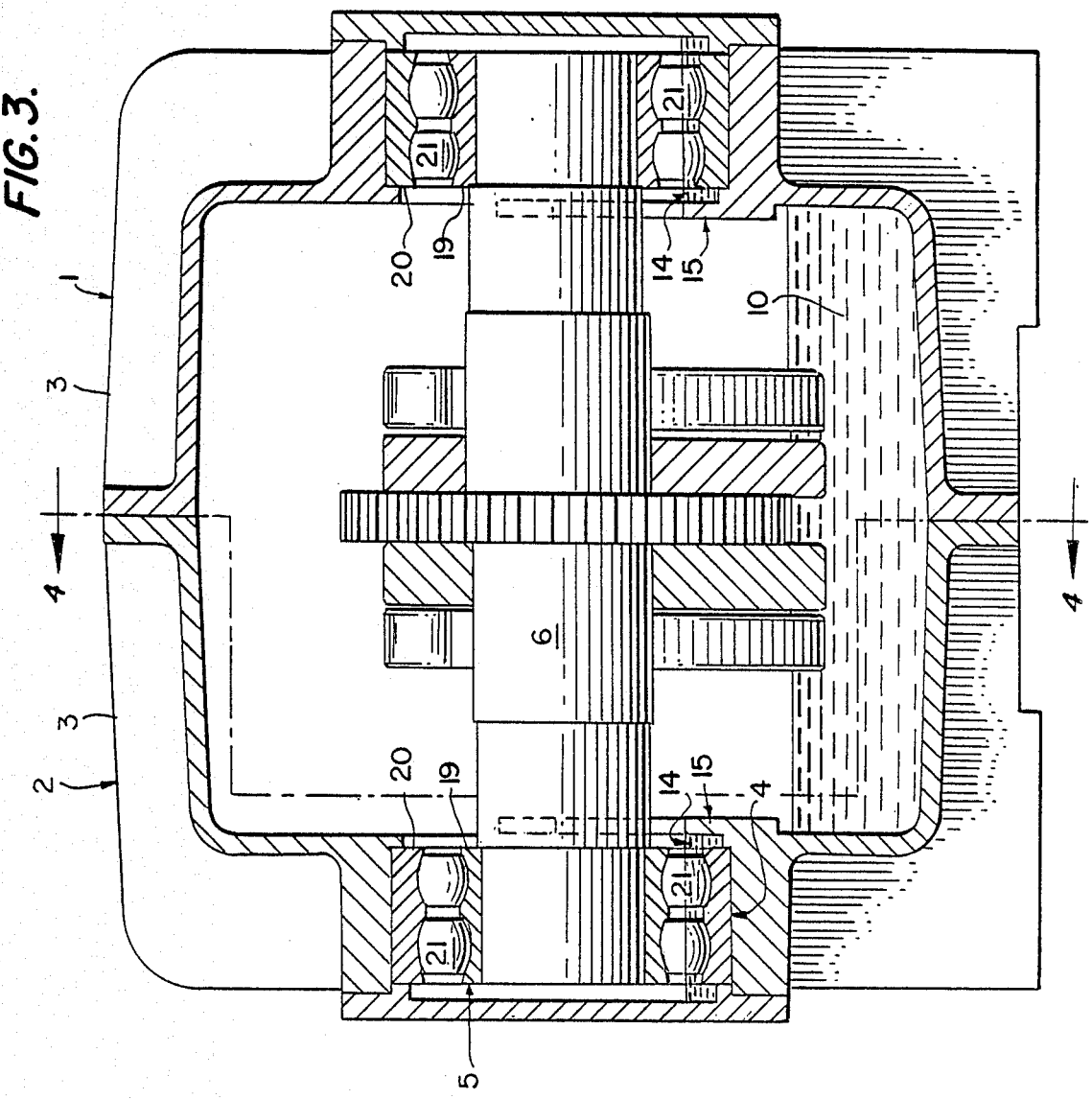
FIG. 3 is a vertical sectional view taken along lines 3—3 of FIG. 1.
Figure 4:
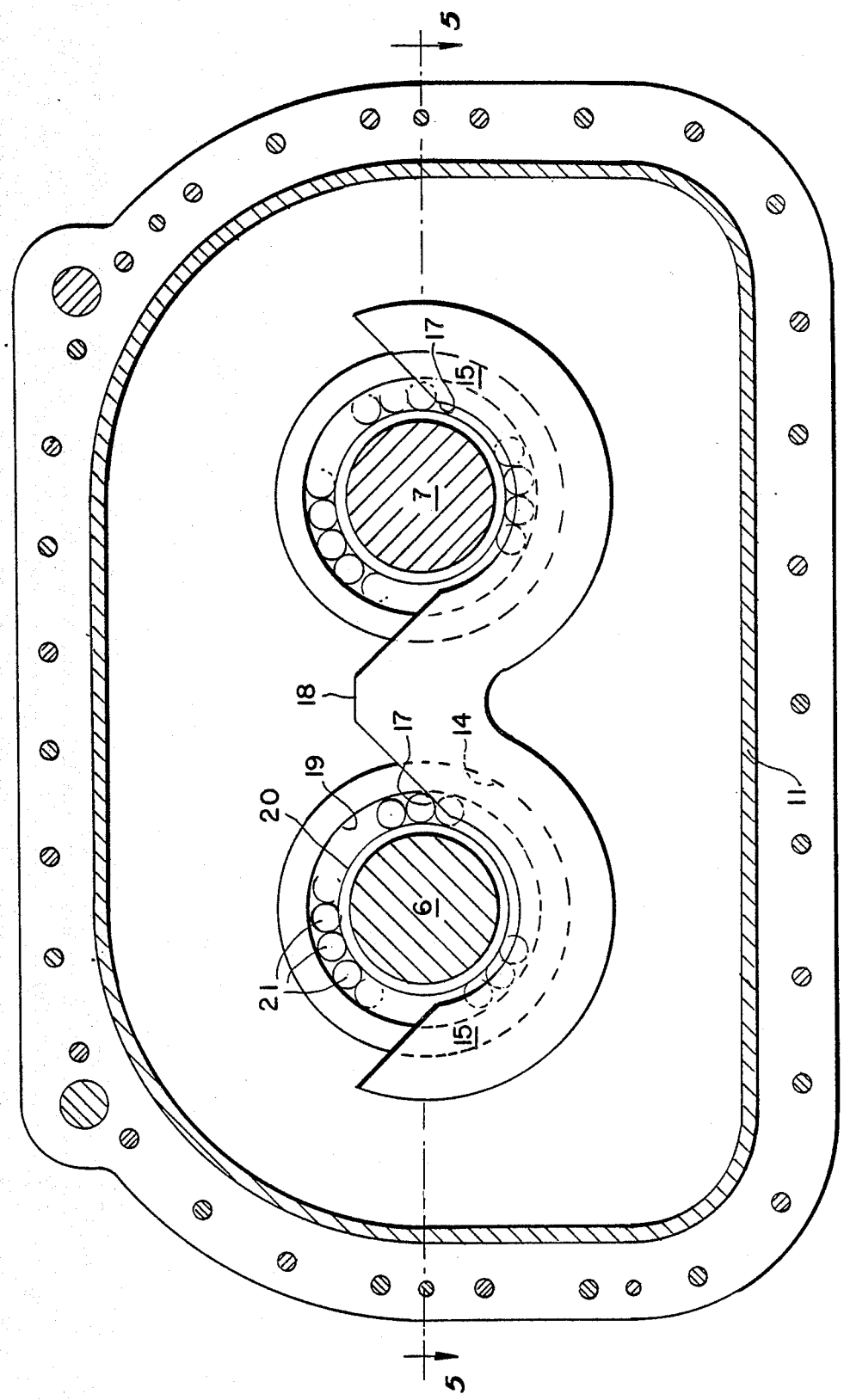
FIG. 4 is a vertical sectional view taken along lines 4—4 of FIG. 3.
Figure 5:
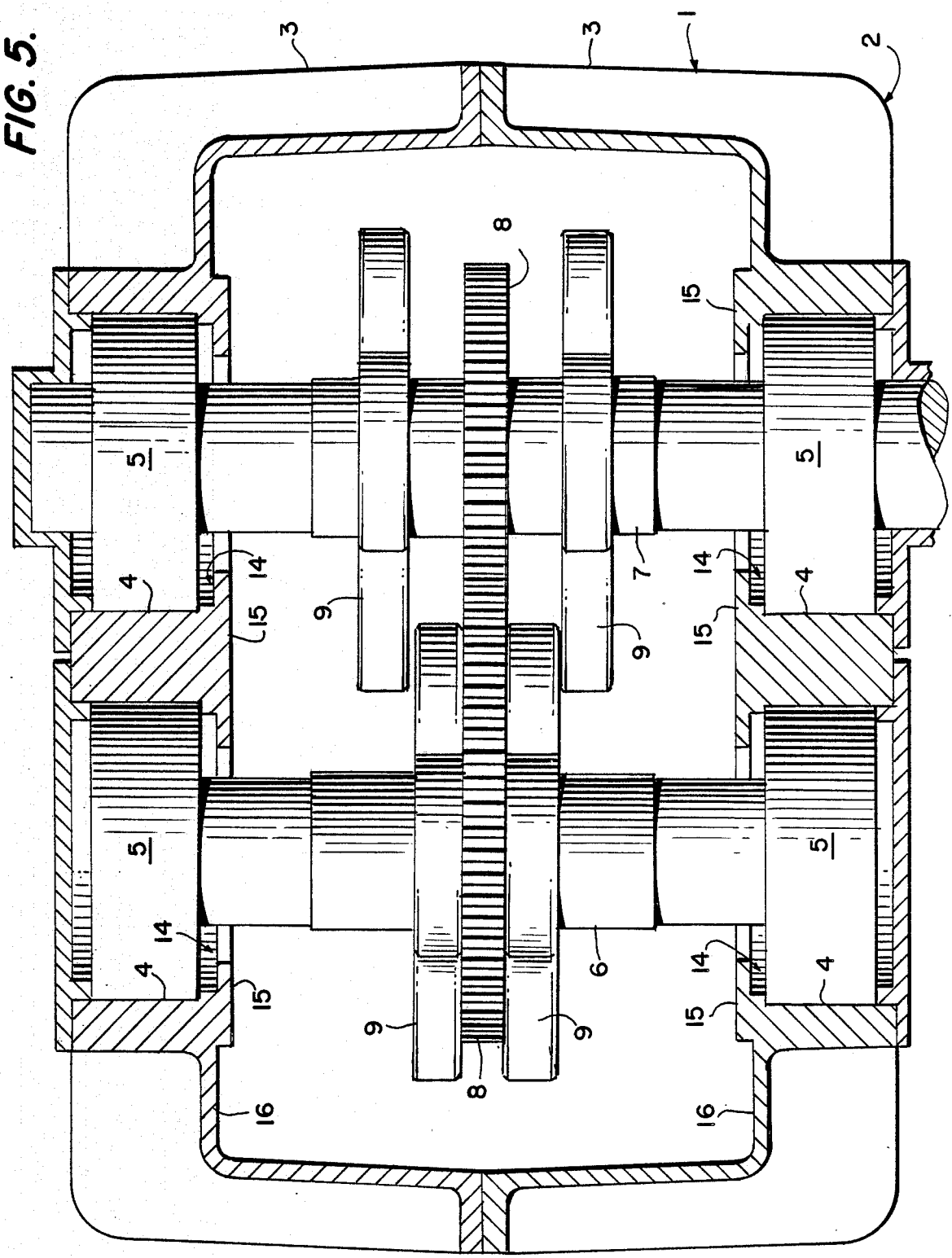
FIG. 5 is a horizontal sectional view taken along lines 5—5 of FIG. 4.

Referring now in detail to the drawings in which like reference characters designate like parts, the improved vibrating mechanism of of the present invention, while adapted to vibrate other horizontal or inclined screening apparatus having one or more levels of screen decks, such as the horizontal type of Jacobson patent No. 3,905,897, in which a solid-liquid or other mixture is deliquified or classified by deck-mounted screen panels, is particularly designed for use with the Vibrating Screening Apparatus of our application filed earlier this March.

Designated as 1, the improved vibrating mechanism of the present invention preferably is mountable at about the center, longitudinally and laterally, and above any screen deck of horizontal vibrating screening apparatus and at a forward tilt for applying a corresponding resultant force to a mixture being screened. The vibrating mechanism 1 is comprised of a housing or casing 2 conveniently formed of duplicate or counterpart cast halves or parts 3 bolted together at the housing's lateral center. In each side of the housing 2 are a pair of laterally spaced cylindrical sockets or pockets 4, each axially aligned with one or a companion of the sockets in the other side. The sockets 4 seat bearings 5, which preferably are self-aligning double row spherical roller bearings, and the bearings in each axially aligned pair of sockets receive opposite end portions of and journal a drive shaft 6 or driven shaft 7 of a pair of parallel laterally spaced intergeared or drivably connected shafts.

Conventionally, in a vibrating mechanism, the shafts 6 and 7 centrally mount their intergearing or connecting gears 8 and each mounts a pair of counterweights 9 straddling or sandwiching its gear and axially spaced from and straddling or straddled by the counterweights on the other shaft. As also conventional, the counterweights are of a length radially of their shafts 6 and 7 to extend or project on each revolution into a pool of oil 10 in a sump 11 in the bottom of the housing 2. Of the shafts, the driven shaft 7 is contained in the housing, while both ends of the drive shaft 6 extend beyond the housing, one end, for the preferred belt-driven mechanism 1, mounting a multi-grooved sheave 12 and the other usually being capped. However, whether the shafts 6 and 7 are contained in or project beyond the housing 2, the bearing-seating sockets 4 are suitably sealed on the outside or externally against loss or escape of oil. Conversely, oil is supplied or added as needed to the sump 11 through a fill-port (not shown) normally closed by a plug or air breather 13.

In a conventional vibrating mechanism for vibrating screening apparatus, the sockets for seating the bearings are open or unobstructed at their inner ends and the bearings are lubricated by oil splashed directly on them by rotating counterweights from a pool in the housing. The improved mechanism 1 also depends for lubricating the bearings 5 on oil splashed by the rotating counterweights 9 from the pool 10 in the sump 11. However, by contrast with those of conventional vibrating mechanisms, the housing 2 has for each socket 4 an individual oil reservoir or gallery 14 for containing a sufficiency of the oil supplied and replenished from the pool 10 to lubricate the bearing 5 in that socket.

Cylindrically concave and concentric with the adjoining socket 4, each of the reservoirs 14 is bounded inwardly or inboardly by a crescent-shaped flange 15 paralleling and inset or spaced inwardly from the confronting or adjoining side 16 of the housing 2 and joined at the bottom to the side by an instanding web 17 concentric with and of substantially the same inside diameter as the adjoining socket. Each flange 15 on its upper margin or rim 18, is cylindrically concave and concentric with but of smaller diameter than the related socket 4. Circumferentially, the flanges 15 overlap and extend inwardly radially beyond the inner races 19 and preferably between or intermediate the inner races and the outer races 20 of the bearings. Of a capacity to contain sufficient oil to immerse or bathe the preferably spherical rollers 21 between the races 19 and 20, the reservoirs 14 are adapted to apply oil internally to the bearings in the zone where lubrication is most effective. For ensuring that such lubrication will be continuous during operation of the mechanism 1, the flanges extend upwardly beyond the point or level to which the oil in the reservoirs could be dragged by adhesion to or centrifugal force on the rollers.

Although the housing 2 has heretofore been described as having a separate inboard or inboard flange 15 for the oil reservoir or gallery 14 of each bearing socket 4, the proximity of the pair of sockets on each side 16 of the housing 2 is such that the pair of flanges at each side conveniently is combined, as illustrated, into a common dual crescent-shaped flange having the bottom a dual cylindrically convex web 17 and at the top a bicrenated or dual cylindrically concave rim 18.

From the above detailed description it will be apparent that there has been provided an improved vibrating mechanism that, instead of depending for lubrication on splashing directly on its bearings oil from a pool in a sump, has for each bearing an individual reservoir formed as part of the socket seating the bearings and so constructed on the inside as to contain and apply to the bearing rollers oil splashed into the reservoirs from a pool in a sump of the housing.

It should be understood that the described and disclosed embodiment is merely exemplary of the invention and thea all modifications are intended to be included that do not depart from the spirit of the invention and the scope of the appended claims.

Having now described our invention, we claim:

1. Vibrating mechanism comprising a housing, cylindrical sockets in opposite sides of said housing, bearings seated in said sockets, a shaft journaled in a pair of bearings in opposite sides of said housing, a sump in said housing between said sides and containing a pool of oil, counterweight means mounted on said shaft between said pair of bearings and projecting on rotation into said pool, and an individual reservoir in said housing for each socket, each reservoir being outwardly closed and inwardly open for receiving oil splashed thereto from said pool by said counterweight means and of a capacity to maintain said oil at a level sufficient to continuously lubricate a bearing in said socket.

2. Vibrating mechanism according to claim 1, wherein each reservoir is cylindrically concave and concentric with and of substantially the same inside diameter as the related socket, and each reservoir is bounded inwardly by a upwardly opening flange inset from an adjoining side of said housing and of an upward extent sufficient to maintain oil at said level supplied thereto during operation of said mechanism.

3. Vibrating mechanism according to claim 2, wherein each of said flanges has a crescent-shaped upper rim concentric with and in part radially overlapping the associated bearing socket.

4. Vibrating mechanism comprising a housing, a pair of laterally spaced cylindrical sockets in each side of said housing, each socket being axially aligned with one of said sockets in the other side and therewith seating bearings journaling one of a pair of intergeared shafts each mounting counterweight means of a radial length to project on rotation into an underlying oil pool in said housing, and an individual oil reservoir in said housing for each of said sockets, each reservoir being bounded internally by upwardly opening flange means inset from an adjoining side of said housing and being of a capacity and extent relative to the related socket to maintain at a level sufficient to lubricate a bearing in said socket with oil splashed to said reservoir from said pool by said counterweight means.

5. Vibrating mechanism according to claim 4, wherein the flange means at each side of the housing is a dual crescent-shaped flange common to and inwardly bounding the reservoirs at that side.

6. Vibrating mechanism according to claim 4, wherein the bearings are spherical roller bearings, and the flange means are of such extent relative to the sockets as to apply oil to rollers between inner and outer races of the bearings in said sockets.

* * * * *